US008645280B2

(12) United States Patent
McKenzie

(10) Patent No.: US 8,645,280 B2
(45) Date of Patent: Feb. 4, 2014

(54) ELECTRONIC CREDIT CARD WITH FRAUD PROTECTION

(76) Inventor: Craig McKenzie, Los Angeles, CA (US)

(*) Notice: Subject to any disclaimer, the term of this patent is extended or adjusted under 35 U.S.C. 154(b) by 47 days.

(21) Appl. No.: 13/316,290

(22) Filed: Dec. 9, 2011

(65) Prior Publication Data
US 2012/0132706 A1 May 31, 2012

Related U.S. Application Data

(63) Continuation-in-part of application No. 12/794,026, filed on Jun. 4, 2010, now abandoned.

(51) Int. Cl.
G06Q 20/00 (2012.01)
(52) U.S. Cl.
USPC ............... 705/67; 705/64; 705/65; 705/72; 705/75; 705/78; 235/379; 235/380
(58) Field of Classification Search
USPC ............ 705/64, 65, 67, 75, 78; 235/379.38
See application file for complete search history.

(56) References Cited

U.S. PATENT DOCUMENTS

| 5,839,119 | A  | * | 11/1998 | Krsul et al. | 705/39 |
| 7,822,666 | B1 | * | 10/2010 | Bursch | 705/35 |
| 7,917,444 | B1 | * | 3/2011 | Bursch | 705/64 |
| 2002/0052842 | A1 | * | 5/2002 | Schuba et al. | 705/40 |
| 2002/0062291 | A1 | * | 5/2002 | Zoka | 705/64 |
| 2005/0171909 | A1 | * | 8/2005 | Woo et al. | 705/44 |
| 2007/0022058 | A1 | * | 1/2007 | Labrou et al. | 705/67 |
| 2008/0222048 | A1 |   | 9/2008 | Higgins et al. |  |
| 2008/0228591 | A1 | * | 9/2008 | Watanabe et al. | 705/26 |
| 2009/0106150 | A1 |   | 4/2009 | Pelegero et al. |  |
| 2009/0156180 | A1 | * | 6/2009 | Slavin et al. | 455/414.1 |
| 2009/0222353 | A1 | * | 9/2009 | Guest et al. | 705/17 |
| 2009/0261166 | A1 | * | 10/2009 | Lawson et al. | 235/449 |
| 2010/0063872 | A1 | * | 3/2010 | Patel et al. | 705/14.1 |
| 2010/0070364 | A1 | * | 3/2010 | Dugan | 705/14.43 |
| 2010/0106649 | A1 | * | 4/2010 | Annan | 705/67 |
| 2010/0125509 | A1 | * | 5/2010 | Kranzley et al. | 705/17 |
| 2012/0303503 | A1 | * | 11/2012 | Cambridge et al. | 705/35 |

FOREIGN PATENT DOCUMENTS

| JP | 2002-032572 A | 1/2002 |
| JP | 2004-030176 A | 1/2004 |

* cited by examiner

Primary Examiner — Mamon Obeid
(74) Attorney, Agent, or Firm — Fulwider Patton LLP

(57) ABSTRACT

A method for verifying permission to use a payment system such as an electronic credit card, using a hand held communication device such as a smart phone, where the customer presents the communication device to a merchant who extracts account information from the hand held device, and the hand held device generates a transaction code that is shared with the merchant and sent by both to a financial institution. The financial institution sends a new random code to the user and the merchant, which can be compared to verify the user's account and the financial institution's approval of the transaction.

7 Claims, 2 Drawing Sheets

ELECTRONIC CREDIT CARD WITH FRAUD PROTECTION

CROSS REFERENCE TO RELATED APPLICATIONS

This is a continuation-in-part of U.S. patent application Ser. No. 12/794,026, filed Jun. 4, 2010, which application is hereby incorporated by reference in its entirely, and who's subject matter common to the present application Applicant claims priority thereto.

BACKGROUND

Smartphone sales in the first quarter of 2010 grew by nearly 49% compared with the first quarter a year ago, the biggest year-on-year increase since 2006, a recent study reported. That rate of growth put smartphones at 17.3% of all mobile phones sold in the first quarter (54.3 million out of 314.6 million) up from 13.6% in the first quarter of 2009. This proliferation of new generation smart phones, such as Apple's iPhone, has led to many new developments in fields that can benefit from the power and proliferation of these devices. One such field is the retail market, and in particular methods of payment for services and merchandise using these smart phones.

There have been many attempts to capitalize on this concept by introducing the concept of an electronic credit card that can be implemented with a smart phone. For example, using the phone a consumer can present the phone to a merchant at a point of purchase, and display a bar code or other identifier that can be used by the merchant to debit the customer's account. For example, Labrou et al., U.S. Patent Publication. 2007/0022058, discloses a mobile device such as a phone or PDA that can be used to conduct a point of sale (POS) transaction using a wireless network. Labrou discusses the use of barcode generated by the mobile phone and read by the merchant to authorize payment. Guest et al., U.S. Patent Publication. 2009/0222353, discloses a mobile credit device where the display of the mobile telephone is used to display an image including a barcode which graphically represents transaction data. This includes data identifying a transaction data base records in a transaction database, the transaction database records including data identifying the mobile radio apparatus account. The system is used for an electronic payment device using a phone or PDA, where an image or barcode is generated and read by the merchant to confirm a transaction. Steinberg, U.S. Patent Publication. 2009/0222459, discloses a method, system, apparatus and computer code to consolidate one or more pieces of information onto an electronic device for later conveyance via wireless transmission, display in human readable form, and/or display in computer readable form. The invention seeks to consolidate multiple credit cards, membership cards, tickets, coupons, and other items which can all be represented electronically on a single device. Other disclosures include that of U.S. Patent Publication. 2009/0261166 to Lawson et al., U.S. Patent Publication. 2009/0299834 to Wilson, U.S. Patent Publication. 2009/0156180 to Slavin et al., U.S. Patent Publication. 2010/0063872 to Patel et al., and U.S. Patent Publication. 2010/0070364 to Dugan. Applicant hereby incorporates by reference each and every disclosure of the references above in their entirety into the present application.

While the above disclosures have shown that there is a need for electronic credit cards and the convenience they provide, not enough attention has been applied to the concept of security and fraud protection. In today's increasingly electronic society and with the rapid advances of electronic commerce on the Internet, the use of credit cards for purchases has become convenient and necessary. Credit card transactions have become the de facto standard for Internet and Webbased e-commerce. However, the growing number of credit card transactions provides more opportunity for thieves to steal credit card numbers and subsequently commit fraud. When banks lose money because of credit card fraud, cardholders pay for all of that loss through higher interest rates, higher fees, and reduced benefits. Hence, it is in both the banks' and the cardholders' interest to reduce illegitimate use of credit cards by early fraud detection. The use of electronic credit cards present a new opportunity to address this aspect of credit card purchases.

SUMMARY OF THE INVENTION

The present invention utilizes the access ability of the smart phone to protect against credit card fraud by having the lending institution or financial institution, rather than the customer or card-holder, provide instant identification to the merchant as to the authorization of the card holder to make a purchase. For example, a customer can present a smart phone with an application running that includes an "electronic credit card." Having selected an item to purchase, the customer activates the application which displays on the smart phone's screen machine readable information such as a bar code or the like that identifies the card holder's account and financial institution. The merchant can read this information using a scanner or other means for reading the bar code, etc. The merchant can then request that the smart phone send a request for authorization directly to the lending institution at the time of purchase. Alternatively, the merchant can send a request through a separate channel to the lending institution outside of the smart phone. When the request is made, the lending institution can provide status on the account (good standing, frozen, fraud alert, etc.) and verify credit limits or account balances if requested. The lending institution can also cause to be displayed on the smart phone in a preferred embodiment, or on a separate screen in another embodiment, identification delivered from the lending institution in the form of a photograph, fingerprint identification, retina scan, or other identification information that positively identifies the person standing before the merchant as the authorized user. Because the identification comes from the lending institution, it cannot be tampered with or otherwise hacked by a user who has stolen the smart phone or is not authorized to use the account. The information can further be verified by an encryption key that allows the merchant to verify the information is from the lending institution. With the identification information, the merchant can compare the data (photo, fingerprint, etc.) and determine if it is safe to proceed with the transaction. In this way, the merchant and the account holder are protected from unauthorized use of the account.

DETAILED DESCRIPTION OF THE PREFERRED EMBODIMENTS

Figure 1:
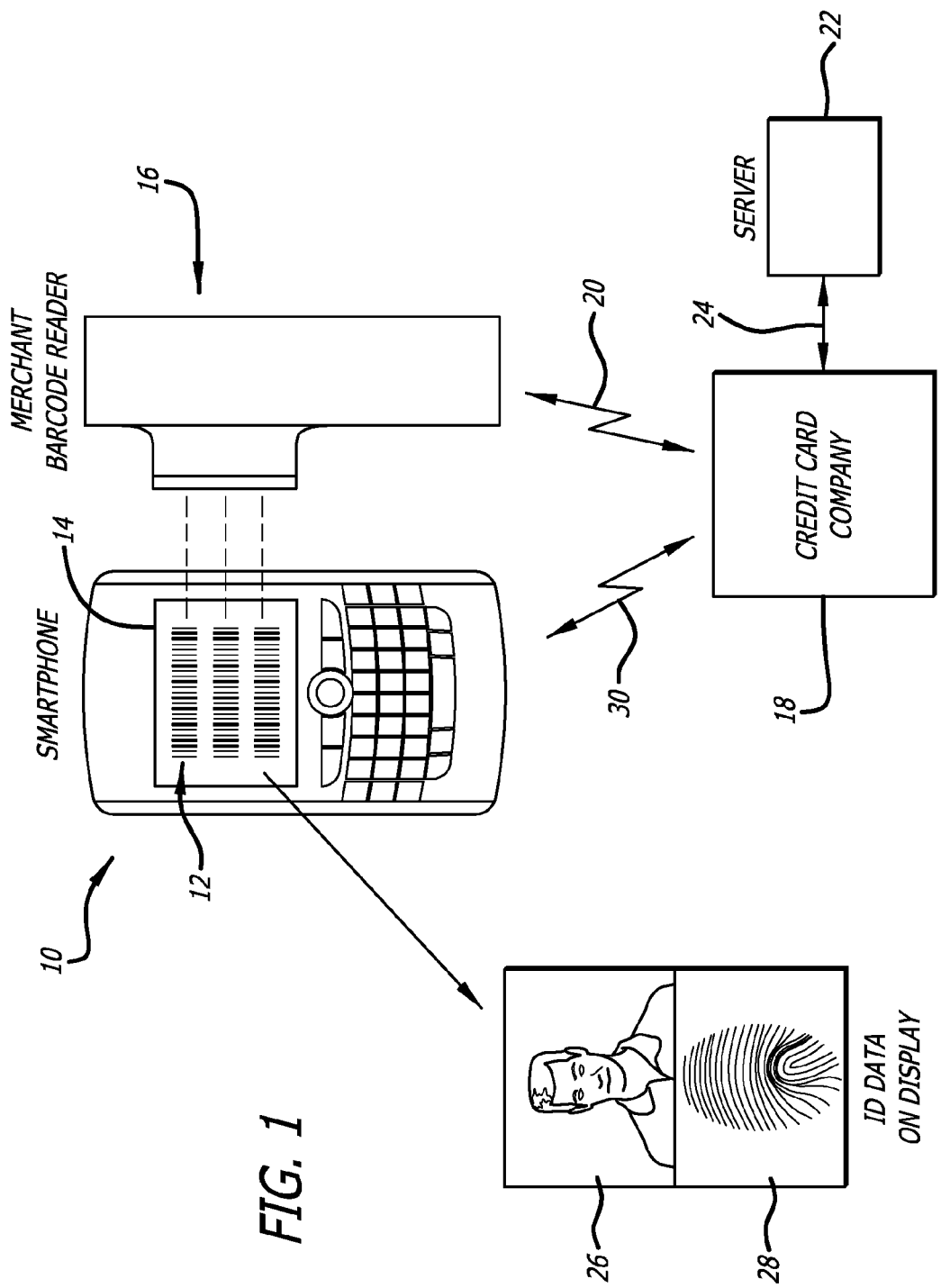
FIG. 1 a schematic view of a method for carrying out the present invention.

FIG. 1 is a schematic diagram of the method of the present invention. The method involves the verification of the identification of a user of an electronic credit card. In order to carry out the invention, the customer will present a smartphone 10 such as an Apple iPhone™ or any of the other popular smartphones on the market that can run applications such as the type described here. When the customer is ready to make a purchase, the customer will activate an application on the phone 10 to cause a machine readable code such as a bar code 12 to be displayed on the screen 14 of the phone 10. The bar code 12 encodes information regarding an account of the customer for use in paying a merchant as part of the contemplated transaction. The merchant then uses an instrument such as, for example, a scanner or bar code reader 16 to read the bar code 12 and extract the customer's account information. The account information could be, for example, a credit card number, expiration date, customer name and address, credit card company and contact information, and account balance or credit limit.

The merchant can extract that information and verify that the account is a valid account and that the transaction does not conflict with any guidelines, credit limits, balances, etc. That is, if the cost of the transaction exceeds the credit limit on the account, the merchant may choose to terminate the transaction. However, if the transaction is otherwise approved, it is still desirable to verify the identify of the customer to make sure the individual present before the merchant is the authorized user of the account. The present invention serves this purpose.

Once the transaction has been conditionally approved, the merchant establishes contact with the credit card 18 company electronically, telephonically, or in another manner requesting that the credit card company cause to be displayed on the phone 10 identification verification information as to the identity of the authorized customer on the account. This request, represented by arrow 20 in FIG. 1, may be derived from information obtained from the bar code 12 (such as a special telephone number, access code, data link protocol, or the like). However, in a preferred embodiment the contact information and protocol to establish the request is established a priori independent of the customer's information to eliminate a potential avenue for fraud. That is, if the link between the credit card company 18 (or bank, lending institution, or any other account verification entity) is accessed solely through information obtained from the phone 10 then there is the opportunity for a thief or non-authorized personnel to obtain the phone without permission, hack into the application software, and direct the merchant to a phony location that will authorize the thief. If, on the other hand, the merchant and the credit card company 18 have an independent pre-arranged protocol then there is no way for a thief to circumvent the verification process.

When the merchant sends the request 20 to the credit card company 18, the credit card company 18 accesses a customer data server 22 that stores the customer information, and access the information specific to that account. This information is established beforehand when the account is opened or the application for the smart phone is activated, and may be for example a photograph stored in digital format, a fingerprint stored in digital format, and retina scan, or other physiological characteristic of the authorized user that would be challenging to mimic. Alternatively, the verification information could be a numerical or alphanumeric sequence known only to the authorized customer. The credit card company retrieves the requested verification date through the link 24, and in a preferred embodiment forwards the information to the phone 10 via an electronic link 30. In the case of a photograph, the image 26 of the authorized user is displayed on the phone's display 14, which can be readily verified by the merchant. If the verification data is in the form of a fingerprint, the phone uses its scanning capability to scan the customer's fingerprint in the presence of the merchant, and then compares the scanned fingerprint 28 with the information corresponding to the authorized customer's fingerprint data using known technology for comparing fingerprints. Other verification data types, such as retina scan, voice recognition, etc are also within the scope of the present invention.

Alternatively, the photograph, fingerprint, or other identification data can be sent to the merchant at a separate display location, such as an liquid crystal display screen (not shown) near the register. In this alternate embodiment, the hand held device is not used to verify the identification, although it can be used to send the request for identification to the lending institution. The lending institution may also send out a "ping" to the account holder's phone to verify the GPS data of the authorized phone. If the authorized phone is at a location other than the merchant's location, the merchant may assume that the customer's phone is either stolen or the authorized user's data has been stolen, and that further investigation at the least is warranted.

Figure 2:
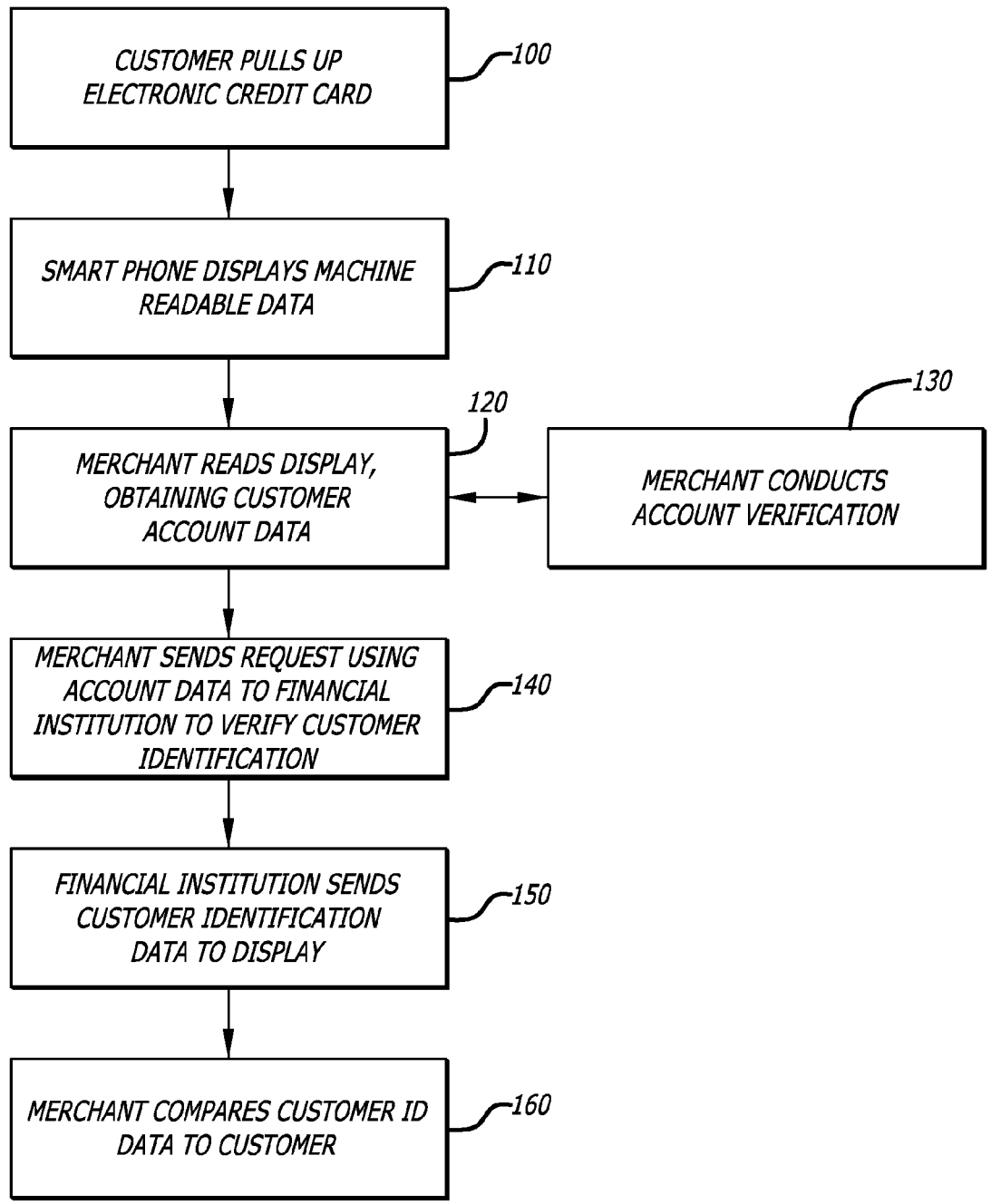
FIG. 2 is a flow diagram of the method of the present invention.

FIG. 2 is a flow diagram of the steps that may be used in conjunction with the present invention, either in a face-to-face transaction or a remote transaction. Box 100 represents the step of the customer activating the application on the smart phone 10, followed by the displaying of the machine readable data in box 110 corresponding to the account information identifying the customer's bank account, credit card information, or the like. Once the information is displayed in a machine readable format, box 120 represents the merchant reading the machine readable information using a bar code scanner, optical recognition means, or other known method of reading the data from the customer's phone display. The merchant may then use the account information to conduct a screening or other account verification process as indicated in box 130, which may include verification that the account is active and in good standing, or that the account does not have any limitations or preconditions that are implicated by the transaction. This verification is routinely conducted with current credit card or debit card transactions.

Once the account verification process is completed, the merchant then sends a request directly to the credit card company in box 140. It is to be understood that the term "credit card company" is used for convenience, but that the entity contacted by the merchant may be a bank, lending institution, or security company used by the credit card company to perform the functions described herein. The request sent by the merchant is preferably conducted without the customer's phone so as to preserve the independence of the security process. The request may come in the form of a digital command to send data to the customer's phone, along with the customer's personal information, phone number or e-mail account, or other contact information. The request may also request that a particular type of identification data be transmitted to the phone, such as a photograph. The command may also be oral, if the request is sent telephonically by the merchant to an individual although in many cases an automated system is preferable. The request may be made directly by the bar code reader 16 as part of a larger system having a processor and data communication devices, or the request may be made by another device initiated by the merchant.

Box 150 corresponds to the fulfillment of the merchant's request, where the credit card company extracts verification information stored in a server or other electronic data storage device that is associated with the electronic credit card account, and sends the verification information to the customer's phone 10. In a preferred embodiment, the verification information is electronic data corresponding to a photograph 26 of the authorized user on the account, which can be used by the phone 10 to display the photograph 26 on the display 14. Other types of information can include a fingerprint 28 of the authorized customer, a retina scan, a voice recognition pattern, or the like. In the case of a voice recognition, the customer would be required to speak into the phone's microphone, whereupon software in the phone's application would compare the voice sample with the authorized voice pattern to determine a match. In the case of a photograph, the merchant would compare the photograph sent by the credit card company with the customer to verify the customer's authorization to use the account. This is an advance over providing a driver's license or the like, which can be doctored or forged. Here, the information comes directly from the credit card company, which has a very real interest in eliminating fraud and verifying the user's identity. In the manner, the present invention provides a cost effective, fraud resistant method for verifying the identity of the customer at the time of purchase.

The identification data may also include an encryption key that is established between the merchant and the lending institution to verify the validity of the data requested. The key may be alphanumeric, bar code, or other types of keys that are known in the art. In this way, the merchant can be confident that the data is actually from the lending institution and that the identification information is valid.

The system may also use a tracking code to verify the transaction. One example would be a "remote-to-remote" system where the purchase could be over the Internet or over a telephone call. In this remote-to-remote transaction, a customer could open an application on his smartphone and select a credit card or financial institution from which the funds will be withdrawn to pay for a purchase. The customer selects a "remote-to-remote" option, which causes the smartphone to generate a randomly created alpha-numeric transaction code. The customer enters the code into a requested field on the web site or reads the code to the merchant representative on the telephone, so that both the customer and the merchant now have the just-generated random transaction code. The customer, having selected the purchase, sends its credit card company or lending institution information on the transaction, including the purchase price, the transaction code, identification information such as photograph, fingerprint, voice pattern, home address, and the like. At the same time, the merchant send information to the customer's credit card company or lending institution, such as the transaction code, transaction details, and the like. Thus, the bank, credit card company, or lending institution receives data from both the customer and the merchant, keyed to a common transaction code.

The bank, credit card company, or lending institution receives the two data packets, and compares the information regarding the transaction. If the two data packets meet the requirements for reliability set by the bank, credit card company, or lending institution (hereafter "bank" for brevity), the bank sends each party (customer and merchant) a new randomly generated transaction code that can be displayed on the smartphone and the merchant's computer or communication device. This bank issued random code can be compared by the merchant to ensure that the bank recognizes the customer and has approved the transaction. At this point, the customer can place a finger on the smartphone's screen and have it read a fingerprint of the customer. Other identifications could include retina scan or voice recognition. The fingerprint is sent to the bank, where it is compared with a stored fingerprint of the customer. This confirms that the person entering into the transaction is actually the person who is responsible for the account, eliminating any fraud where a smartphone is lost or stolen. With the account verified and the identity verified, the purchase can now move forward to completion.

In a face-to-face transaction, such as a customer who wants to purchase something in a store or other in person transaction, the customer turns on a smartphone and selects a credit card or banking institution to pay for the transaction. The customer opens a smartphone application corresponding to the selected banking institution or lender, and selects a face-to-face option. The smartphone then generates a random transaction code, which is shared by the customer with the merchant. The code could also include information such as a phone number or GPS location to help verify the location or identity of the customer to the bank. The merchant scans or enters the random transaction code and sends the information to the bank, along with any transaction data such as the amount of the purchase, current time, and the like. The customer also sends the transaction code to the bank, so the bank receives two incoming data packets with a common randomly generated transaction code. This links the two parties and the transaction at the bank.

The bank, having received the two packets, compare the data and evaluate whether the data packets satisfy the bank's criteria for reliability. If the bank determines that the transaction meets the criteria and is otherwise approved (not over the limit, customer not in bad standing, etc.), the bank issues to the customer and the merchant a new random transaction code that is displayed on the customer's smartphone and the merchant's computer screen. The merchant can see the customer's code and verify that it is the same as the one issued by the bank to the merchant. If the two codes match, the merchant is assured that the bank recognizes the customer's account and has approved the transaction. The customer then places a finger on the smartphone, and sends a fingerprint to the bank, which confirms the identity of the customer and sends a confirmation to the merchant that the customer is positively identified. The positive identification can also include a set of numbers that match the numbers on the credit card or smartphone display, further confirming the customer is in fact present before the merchant. The transaction can then be completed.

The foregoing description and the figures referenced therein are merely illustrative of the invention. Those of ordinary skill in the art will readily recognize that other variations are available and can be substituted for the particular steps described above. Therefore, nothing in the foregoing description should be taken as limiting the invention to a particular step or method of verification. Rather, the scope of the invention is properly measured by the appended claims, giving the words therein their ordinary and customary meaning as interpreted using the foregoing description for context.

I claim:

1. A method for conducting a transaction between a customer and a merchant using a hand held communication device, comprising:

selecting an account on the hand held communication device by a user;

opening an application on the hand held device corresponding to the account;

generating a first random transaction code using the hand held device;

providing the first random transaction code to the merchant;

sending the first random transaction code to a financial institution associated with the account, using the smartphone and having the merchant send a second random transaction code to the financial institution;

having the financial institution match the first and second random transaction codes to link the merchant and the user, and assess a requested transaction for reliability;

upon approval, having the financial institution send the user and the merchant a new random code to the user's smartphone and a merchant's display;

comparing the new random code sent to the merchant with the new random code sent to the user, to verify the account;

scanning a portion of the user and sending the scan to the financial institution to verify identify of the user;

upon verifying the user's identification, sending a verification notice to the merchant; and completing the transaction after the merchant receives the verification notice.

2. The method for conducting a transaction of claim 1 wherein the portion of the user scanned is a fingerprint.

3. The method for conducting a transaction of claim 1 wherein the hand held communication device is a smartphone.

4. The method for conducting a transaction of claim 1 wherein merchant and the user are face to face.

5. The method for conducting a transaction of claim 1 wherein merchant and the user are remotely located with respect to each other.

6. The method for conducting a transaction of claim 1 wherein the verification notice includes GPS data of the smartphone.

7. The method for conducting a transaction of claim 1 wherein verification notice includes information that can be found on the user's smartphone in connection with the account.

* * * * *